United States Patent [19]

Thornburg

[11] Patent Number: 4,852,456
[45] Date of Patent: Aug. 1, 1989

[54] DECOY SYSTEM

[75] Inventor: Francis L. Thornburg, Sapulpa, Okla.

[73] Assignee: Northrop Corporation, Hawthorne, Calif.

[21] Appl. No.: 262,660

[22] Filed: Oct. 26, 1988

[51] Int. Cl.$^4$ .......................... F41F 5/02; F41B 13/42
[52] U.S. Cl. ..................................... 89/1.51; 102/388; 102/505
[58] Field of Search ....................... 89/1.51, 1.56, 1.57; 102/504, 505, 342, 340, 348, 351, 386, 388, 393

[56] References Cited

U.S. PATENT DOCUMENTS

| | | | |
|---|---|---|---|
| 2,044,819 | 6/1936 | Taylor | 102/388 |
| 2,913,198 | 11/1959 | Bonbrake | 89/1.51 |
| 3,068,756 | 12/1962 | Schermuly | 89/1.51 |
| 3,315,564 | 4/1967 | Hazlett et al. | 89/1.51 |
| 3,430,533 | 3/1969 | Kifor et al. | 89/1.51 |
| 3,780,662 | 12/1973 | Sorenson | 102/504 |
| 4,026,188 | 5/1977 | Woodruff et al. | 89/1.51 |
| 4,031,828 | 6/1977 | Larson | 102/505 |
| 4,444,085 | 4/1984 | Dragonuk | 89/1.51 |
| 4,632,010 | 12/1986 | Humphries et al. | 89/1.51 |

Primary Examiner—David H. Brown
Attorney, Agent, or Firm—Terry J. Anderson; Robert B. Block

[57] ABSTRACT

A radar decoy ribbon packed within a dispenser body is launched from an aircraft by creating, within a launch tube, gas pressure sufficient to expel a frangible retaining plug from the outer end of the tube, driving the dispenser body into the airstream. The body has a pair of drag vanes which open in the air stream. As the dispenser recedes from the craft, the ribbon, one end of which is attached to the aircraft by a towline, is paid out of the body. Once the ribbon is fully deployed, a drogue maintains tension on the ribbon until the towline is severed.

15 Claims, 2 Drawing Sheets

DECOY SYSTEM

BACKGROUND OF THE INVENTION

This invention relates to a system for launching a decoy from an aircraft for defensive purposes. The invention is particularly concerned with a decoy system for diverting from an aircraft a missile guided by radar and/or infrared means.

Prior inventors have dealt, in various ways, with the problem of diverting radar-guided missiles from an aircraft. Airborne chaff dispenser have been developed for this purpose, and it has also been proposed, as in U.S. Pat. No. 2,898,588, to tow a highly radar-reflective target behind an aircraft to confuse enemy radar. Towed flares have been employed as well, to mislead infrared seeking missiles.

SUMMARY OF THE INVENTION

It is an object of the present invention to provide a radar decoy in the form of a radar-reflective ribbon towed from an aircraft.

Another object is to permit rapid, remote deployment of such a ribbon.

A further object is to provide a dispensing system for a radar-reflective ribbon, whose outer surface is flush with the skin of the aircraft before and after use.

Another object is provide a dispenser which can be reloaded from within the aircraft.

It is another object of the invention to permit one to replace or augment a radar-reflective ribbon with flare material to act as an infrared source, for decoying heat-seeking missiles.

These and other objects are attained by a radar decoy deploying apparatus for an aircraft comprising a launch tube mounted on the aircraft, the launch tube having a first, normally closed end within the aircraft, and a decoy dispenser comprising a hollow body containing a length of towline and a length of radar-reflective material connected to a first end of the towline, and means for securing a second end of said towline within the launch tube. An outer plug retains the dispenser within the launch tube, and means are provided for driving the dispenser out of the tube with sufficient force to expel the retaining means and eject the dispenser from the launch tube.

BRIEF DESCRIPTION OF THE DRAWINGS

In the accompanying drawings.

DESCRIPTION OF THE PREFERRED EMBODIMENT

Figure 1:
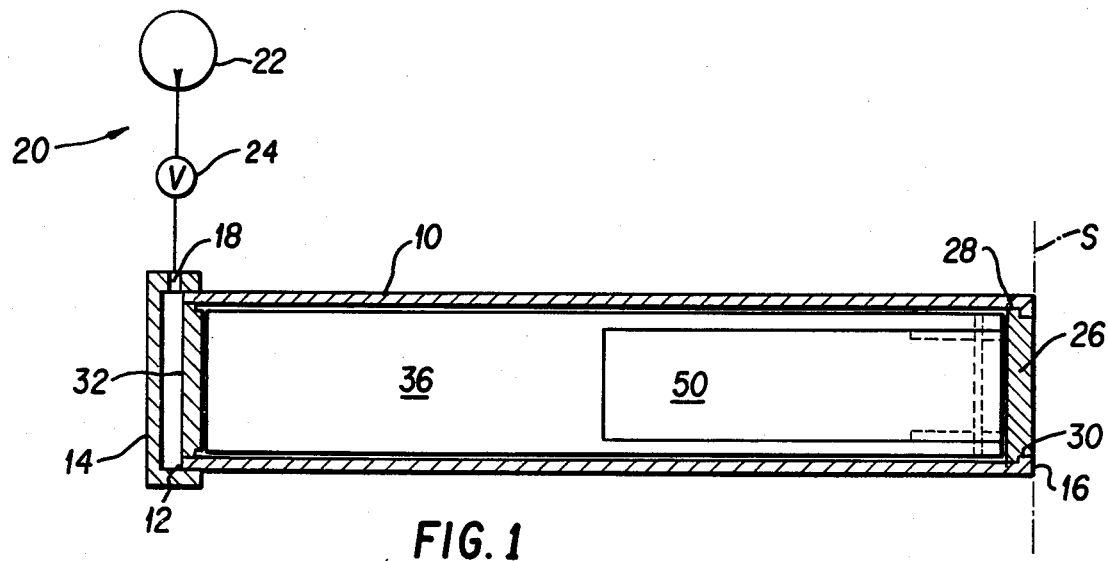
FIG. 1 is a side view of a decoy dispensing system embodying the invention, illustrating a dispenser (in elevation) within a launch tube (in section)

As shown in FIG. 1, a system embodying the invention comprises a launch tube 10 mounted in an aircraft. The launch tube has a first end 12 closed by a removable reloading cap 14 and a second end 16 directed away from the aircraft, and flush with the outer skin S thereof.

The reloading cap, which can be accessed from within the aircraft, has a gas port 18 providing communication for compressed gas from a source 20 within the aircraft to the interior of the launch tube. The compressed gas source may comprise a pressurized gaas supply 22 associated with a remotely operable, normally closed valve 24 as shown; alternatively, it may be a remotely fireable propellant system, either within or outside the launch tube.

An outer plug 26 having frangible peripheral fingers 28 is retained within the second end 16 of the tube by an internal flange 30 at the second end thereof.

An inner plug 32, similar in construction to the outer plug, is movably retained within the launch tube near the first end 12 thereof. The flange 30 prevents escape of the inner plug following release of the dispenser.

Figure 2:
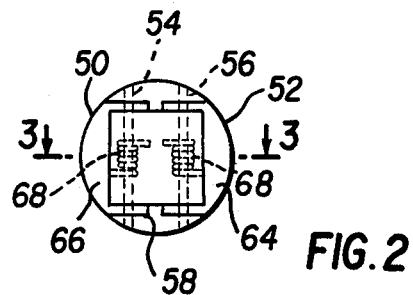
FIG. 2 is an end view of the dispenser only, taken from the right in FIG. 1.
Figure 3:
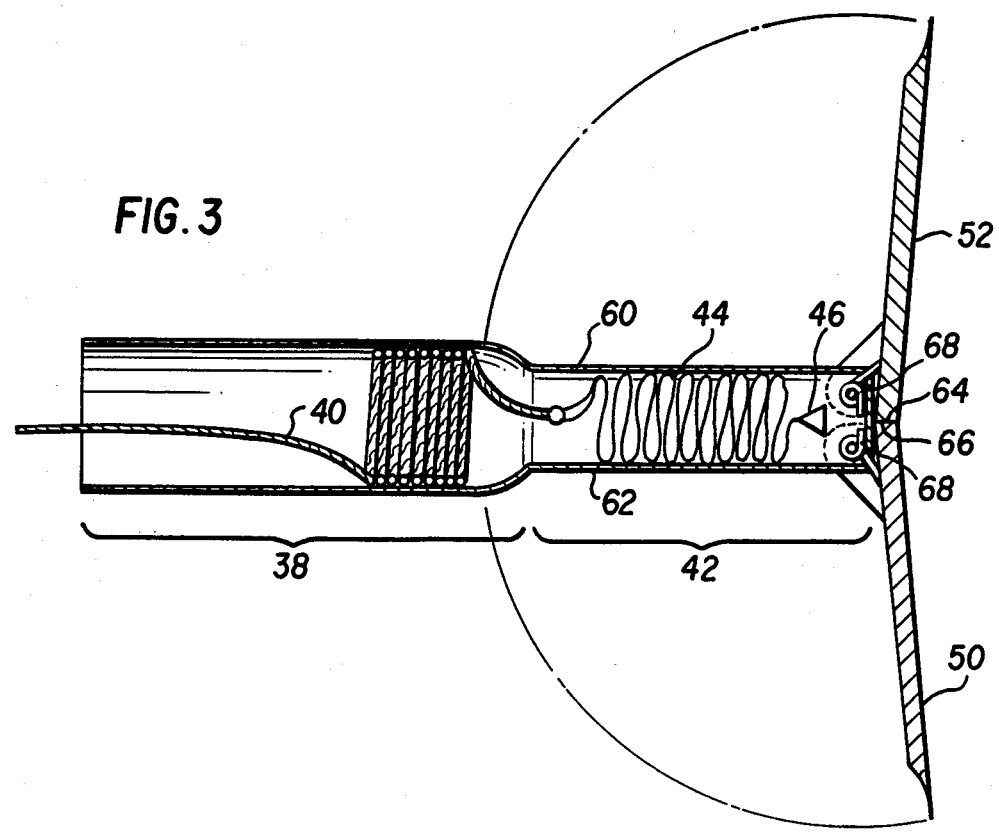
FIG. 3 is a sectional view of the dispenser, taken along the line 3—3 in FIG. 2.

The outer plug 26 retains within the launch tube a dispenser body 36, details of which are shown in FIGS. 2 and 3. The dispenser body includes a generally cylindrical, hollow first portion 38 containing a length of braided nylon towline 40, which is helically wound around the inside of the first body portion 38 as shown, and a second body portion 42 having a square interior, housing a length of radar-reflective ribbon 44. The ribbon is folded in accordion manner, somewhat like a parachute, and the folds are secured by rubber bands; details of the ribbon do not form part of the invention. Suffice it to say that the ribbon is highly reflective of aircraft tracking radar signals, and has adequate mechanical strength to support the weight and drag of a drogue 46 attached to the end thereof. The towline and ribbon are connected in series so that the towline is paid out first when the dispenser is launched. If desired, a flare may also be connected to the towline, for confusing infrared seeking systems. The drogue and flare should be of low mass, to minimize impact loading on the ribbon and towline. If the ribbon strength is inadequate, the towline may be extended along the length of the ribbon to the drogue.

As shown in FIG. 2, the dispenser has two drag vanes 50, 52, pivotally connected to the body by pins 54, 56 which extend through hinge plates 58 that rest in cut-outs machined in the body when the vanes are in their stowed position (FIGS. 1–2). The vanes unfold to a deployed position (FIG. 3) slightly greater than 90° from the body. The cross-section of each vane is preferably a circular segment so that when the vanes are folded against the flattened sides 60, 62 of the dispenser, they lie within a cylindrical envelope extending from the first body portion. The end faces 64, 66 of the vanes limit their opening movement by abutting one another so as to serve as mutual stops (FIG. 3). Biasing means such as springs 68 assist in the deployment of the vanes once the dispenser is free of the launch tube.

Figure 4:
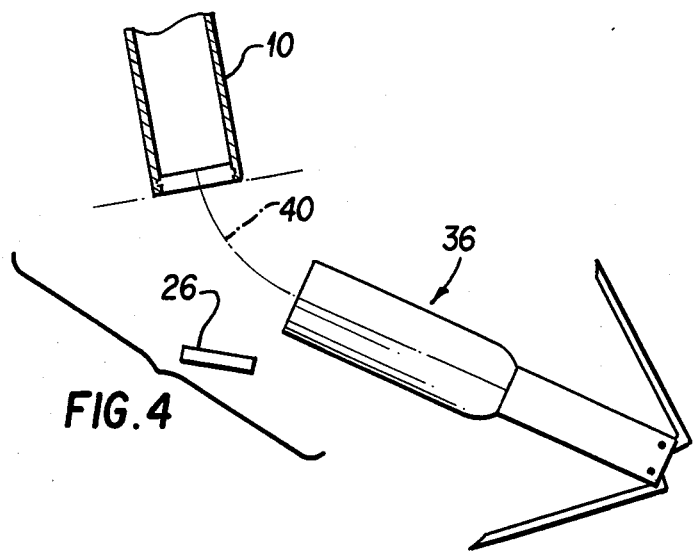
FIGS. 4–6 show successive phases of launching and dispensing the decoy.
Figure 5:
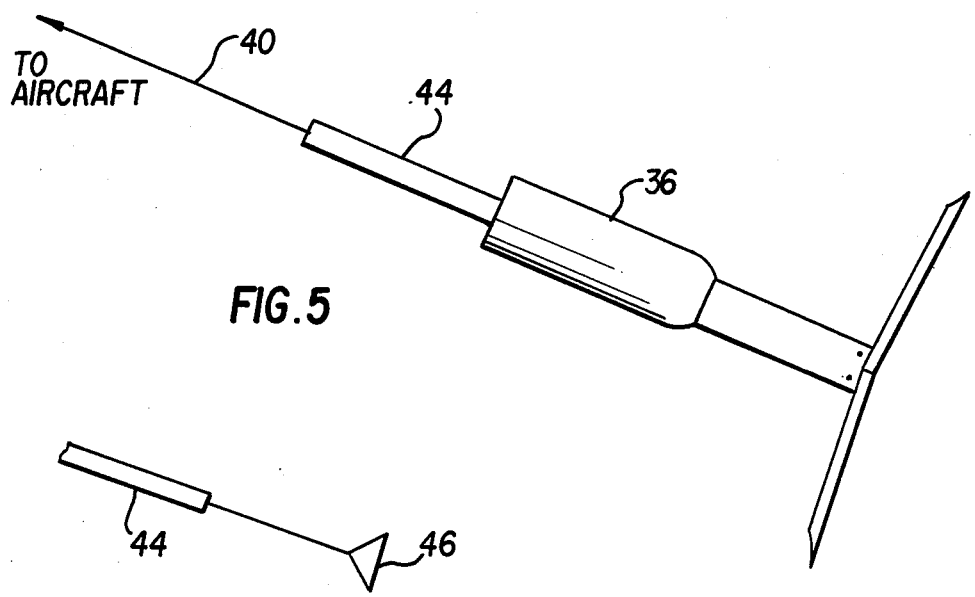
Figure 6:
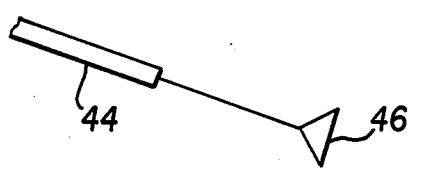
Figure 6:
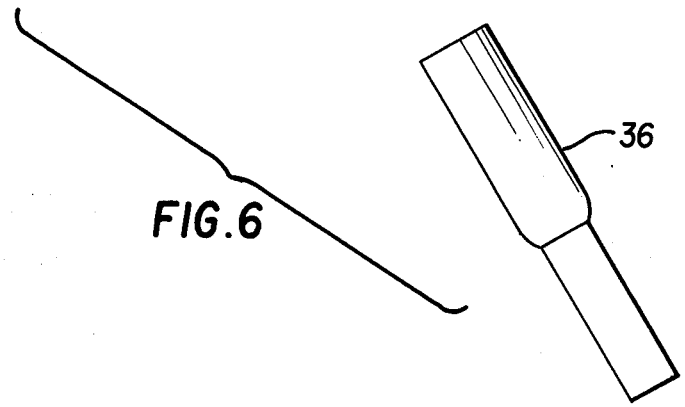

In operation, the dispenser is ejected by releasing pressurized gas into the tube. The gas pressure is chosen to be sufficient to drive the inner plug and dispenser outward with force adequate to break the fingers of the outer plug. The dispenser enters the airstream with sufficient velocity to escape the boundary layer of the aircraft (FIG. 4). After the dispenser leaves the launch tube, the vanes, aided by their springs, unfold from the dispenser body, creating drag to retard the dispenser with respect to the aircraft. As the dispenser recedes from the aircraft, one end of the towline remains attached to the aircraft via the inner plug, so that first the towline and then the ribbon pay out from the dispenser body (FIG. 5). Once the ribbon is fully paid out, the dispenser, not being connected thereto, is lost, and the ribbon, maintained under tension by the drogue, remains trailing behind the aircraft (FIG. 6) until severed by an automatic cutting device, which may be of the spark discharge type. Thereafter, the tube, whose outer end 16 is now closed by the plug 32 (now acting as an outer plug), can be reloaded from within the aircraft by removing the cap 14 from the launch tube, and inserting a fresh dispenser body and a new inner plug.

A particular advantage of the invention is that the dispenser body, despite is mass, does not stress the ribbon or the towline as the latter become fully deployed, since the body is completely unattached to the towline. The only impact is that of the low-mass drogue or flare. Because there is no impact problem, deployment speed can be as rapid as possible, and in fact the launch tube and drag vanes are designed to minimize deployment time.

The invention is subject to variations within the skill of the art. For example, materials other than those suggested above may be substituted. Therefore, the preceding description and accompanying drawings should be interpreted as merely illustrative of the invention defined by the following claims.

I claim:

1. A radar decoy deploying apparatus for an aircraft comprising
    a launch tube having a first, normally closed end and a second end terminating at the skin of said aircraft;
    a decoy dispenser adapted to fit within the launch tube, the dispenser comprising a hollow body containing a length of towline and a length of radar-reflective material connected to a first end of said towline;
    a plug disposed within said tube between said dispenser and said first end, the other end of said towline being connected to said plug, said plug being moveable from said first end toward said second end;
    means for retaining said dispenser within said launch tube; and
    means for driving said plug and said dispenser away from said first tube end with sufficient force to expel said retaining means and eject the dispenser from the second end of the launch tube.

2. The invention of claim 1, further comprising means for creating aerodynamic drag attached to a trailing end of said radar reflective material.

3. The invention of claim 1, wherein said radar reflective material is a ribbon.

4. The invention of claim 1, wherein neither said towline nor said radar-reflective material is connected to said dispenser body.

5. The invention of claim 1, wherein said dispenser body is generally cylindrical and has a longitudinal axis, and said towline is wound within said body around said axis.

6. The invention of claim 5, wherein said radar reflective material is a ribbon, and said ribbon is folded within said dispenser body in accordion fashion.

7. The invention of claim 1, wherein said dispenser retaining means comprises an outer plug and means for holding said outer plug at said second end of the tube.

8. The invention of claim 7, wherein said holding means comprise a plurality of frangible fingers on said outer plug and an internal flange on said tube for abutting said fingers so as to prevent escape of said plug until said fingers are broken.

9. The invention of claim 1, wherein said means for driving the dispenser away from the first end of the launch tube comprises means for creating gas pressure within said launch tube.

10. The invention of claim 9, wherein said means for creating gas pressure comprises a compressed gas supply and a valve for releasing gas from said supply into said launch tube.

11. The invention of claim 1, further comprising at least one drag vane attached to the dispenser body to cause the dispenser to separate from the aircraft and thereby pay out the towline and radar-reflective material.

12. The invention of claim 11, wherein said drag vane is pivotally connected to the dispenser body so as to be movable from a stowed position against the body when the dispenser is within the launch tube, to a deployed position away from the body once the dispenser leaves the launch tube.

13. The invention of claim 12, wherein said body is generally cylindrical but has a flat on its exterior surface, and said drag vane in its stowed position rests against said flat.

14. The invention of claim 12, further comprising means for biasing said vane toward its deployed position.

15. The invention of claim 12, wherein said body has two of said flats on opposite sides thereof, and two vanes pivotally connected thereto at that end of the body more remote from the first tube end, each of said vanes having an end surface adjacent its pivotal connection, said end surfaces being constructed to abut one another when said vanes are in their deployed positions, to act as mutual stops.

* * * * *